Dec. 9, 1958 J. W. ATTWOOD 2,863,625
PIPE OR TUBING SUPPORT OR HANGER
Filed April 16, 1954
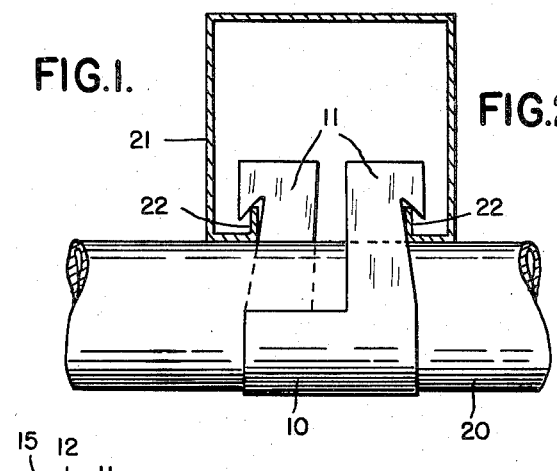
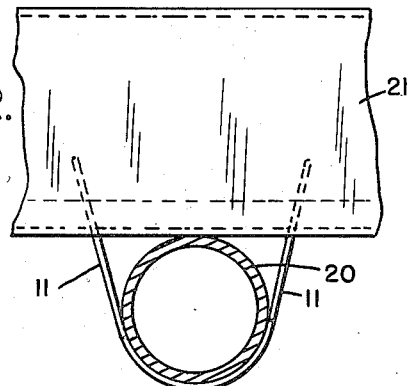
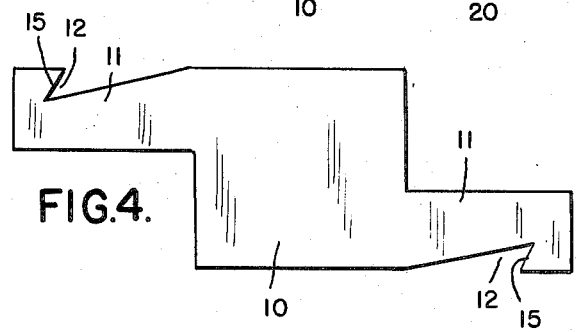
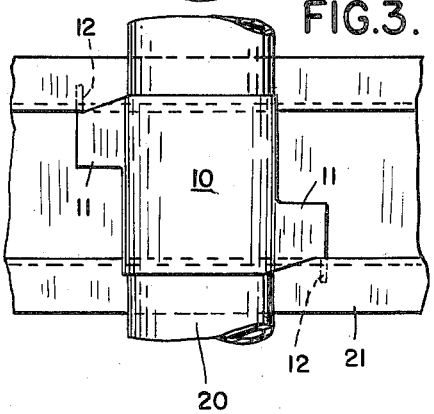
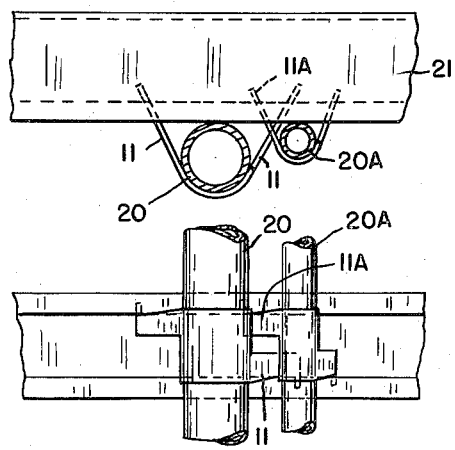
INVENTOR.
JAMES W. ATTWOOD
ATTORNEYS

# United States Patent Office 2,863,625
Patented Dec. 9, 1958

2,863,625

PIPE OR TUBING SUPPORT OR HANGER

James W. Attwood, Wayne, Mich.

Application April 16, 1954, Serial No. 423,607

4 Claims. (Cl. 248—62)

The present invention relates to support means for hangers for pipes, tubes or the like, and has among its objects the simplification and reduction in cost of such devices.

Another object is a tube support adapted for use with a channel member having inturned flanges and specifically with the structural material known as "Unistrut."

Still another object is a support which may be applied quickly and easily without the use of tools and which permits the close grouping of pipes or tubes.

The material above referred to as "Unistrut" consists of a sheet metal channel member of which the side walls are turned in at right angles and these turned-in walls again turned inwardly at right angles, so that a section of such channel shows a longitudinal centrally located slot defined by inwardly projecting flanges. The edges of said inwardly projecting flanges are preferably sharpened.

In the drawing:

Fig. 1 shows in side elevation one of the hangers with a pipe in space and supported upon a fixed "Unistrut" member (in section).

Fig. 2 is an elevation of the same elements taken at right angles to Fig. 1.

Fig. 3 is a bottom plan view of the same.

Fig. 4 is a plan view of one of the hangers in extended flattened condition.

Fig. 5 is a view similar to Fig. 2 showing the grouping of tubes or pipes.

Fig. 6 is a bottom plan view of Fig. 5.

As shown in the drawing, the hanger is illustrated as suspending the pipe or tube beneath its fixed supporting member but it is equally adaptable for use in positions where the tubes overlie the fixed support or where the latter is vertical.

The hanger itself consists of a strip of sheet metal, preferably spring steel or other metal, having at its ends the arms or tongues 11 arranged at diagonally opposite corners of portion 10 and of a width somewhat less than the width of the latter.

Each of the tongues 11 is provided in its outer edge near its free end with a V-shaped notch 12, the outer wall of which, 15, is inclined inwardly of the notch as shown.

The overall length of the hanger will vary with the size of the tube or pipe to be supported and should be sufficient to embrace the tube as it lies in contact with the fixed support member and have the arms or tongues 11 extend diagonally outward.

In Figs. 1, 2 and 3 the hanger is shown as securing a tube or pipe 20 to a fixed support 21 of "Unistrut" material with the pad portion 10 embracing the tube and the tongues extending into the support member and the hooks 12 embracing the inwardly projecting flanges 22 of the latter.

As stated above, the hanger tongues 11 are arranged at diagonally opposite corners of the pad portion 10 and of a width somewhat less than half the width of the pad portion. This arrangement permits close grouping of a plurality of parallel tubes as shown in Figs. 5 and 6.

In these figures two tubes 20 and 20A are shown with their hanger tongues 11 and 11A overlapping. This overlapping is possible by reason of the narrow tongues 11 being able to pass a tongue 11A and extend under the adjacent tube, or vice versa.

Now having described the invention and the preferred embodiment thereof, what is claimed is:

1. Means for supporting a tube or pipe consisting of a fixed support having a longitudinal slot and having inwardly projecting flanges at the sides of said slot and a hanger consisting of a strip of sheet metal having a central rectangular pad portion provided with longitudinally extending tongues at diagonally opposite corners of said pad portion, said tongues being each provided in its outer edge adjacent the free end, with a notch, said tongues extending into said slot with said notches engaging said flanges, with the pad portion providing a loop embracing said tube or pipe.

2. Means for supporting a tube or pipe, consisting of a fixed support having a longitudinal slot and having inwardly projecting flanges at the sides of said slot and a hanger consisting of a strip of sheet metal having a central rectangular pad portion provided with longitudinally extending tongues at diagonally opposite corners of said pad portion, said tongues being each provided in its outer edge adjacent the free end, with a notch, the outer wall of said notch being inclined inwardly of the notch, said tongues extending into said slot with said notches engaging said flanges, with the pad portion providing a loop embracing said tube or pipe.

3. A pipe or tube hanger consisting of a strip of sheet metal having a rectangular pad portion and having longitudinally extending tongues arranged at diagonally opposite corners of said pad portion, said tongues being of a width less than one half the width of the pad portion and being provided adjacent their free ends and in their outer edges with a notch.

4. A pipe or tube hanger consisting of a strip of sheet metal having a rectangular pad portion and having longitudinally extending tongues arranged at diagonally opposite corners of said pad portion, said tongues being of a width less than one half the width of the pad portion and being provided adjacent their free ends and in their outer edges with a notch, the outer wall of said notch being inclined inwardly of the notch.

References Cited in the file of this patent

UNITED STATES PATENTS

| 181,602 | Smith | Aug. 29, 1876 |
| 1,755,201 | Blackburn | Apr. 22, 1930 |
| 2,014,971 | Knutson | Sept. 17, 1935 |
| 2,541,908 | Attwood | Feb. 13, 1951 |
| 2,674,431 | Attwood | Apr. 6, 1954 |